United States Patent
Iwa et al.

(10) Patent No.: US 10,077,849 B2
(45) Date of Patent: Sep. 18, 2018

(54) CAPACITY CONTROL VALVE

(71) Applicant: EAGLE INDUSTRY CO., LTD., Minato-ku, Tokyo (JP)

(72) Inventors: Toshiaki Iwa, Tokyo (JP); Yoshihiro Ogawa, Tokyo (JP); Kohei Fukudome, Tokyo (JP); Kenji Moriwaki, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 15/872,781

(22) Filed: Jan. 16, 2018

(65) Prior Publication Data

US 2018/0156349 A1    Jun. 7, 2018

Related U.S. Application Data

(63) Continuation of application No. 14/384,045, filed as application No. PCT/JP2013/063501 on May 15, 2013.

(30) Foreign Application Priority Data

May 24, 2012 (JP) ................................. 2012-118385

(51) Int. Cl.
    *F16K 31/06* (2006.01)
    *G05D 16/06* (2006.01)
    (Continued)

(52) U.S. Cl.
    CPC ...... *F16K 31/0613* (2013.01); *F04B 27/1804* (2013.01); *F16K 11/0716* (2013.01);
    (Continued)

(58) Field of Classification Search
    CPC ............ G05D 16/0619; G05D 16/2013; Y10T 137/86622; Y10T 137/86702;
    (Continued)

(56) References Cited

U.S. PATENT DOCUMENTS

| 2,308,183 A | 1/1943 | Lewis ........................ 251/335.3 |
| 3,787,023 A | 1/1974 | Shufflebarger ............. 251/335.1 |

(Continued)

FOREIGN PATENT DOCUMENTS

| JP | 2000266182 | 9/2000 |
| JP | 2003172449 | 6/2003 |

(Continued)

OTHER PUBLICATIONS

International Search Report dated Jun. 11, 2013, issued for International Application No. PCT/JP2013/063501.
(Continued)

*Primary Examiner* — Craig J Price
(74) *Attorney, Agent, or Firm* — Hayes Soloway P.C.

(57) ABSTRACT

A capacity control valve includes: a pressure-sensitive body positioned in a third valve chamber; an adapter provided on the free end of the pressure sensitive body having a circular seating surface; a third valve part that moves integrally with a valve element in the third valve chamber and has a circular engagement surface that opens/closes intake-side passages by engaging with and separating from the seating surface of the adapter. The valve element is located between the first valve chamber and the second valve chamber, and has an outer circumferential face part slidably movable relative to an inner circumferential face of the valve body, with plural threads of screw grooves are formed on the outer circumferential face part.

3 Claims, 6 Drawing Sheets

(51) Int. Cl.
*G05D 16/20* (2006.01)
*F04B 27/18* (2006.01)
*F16K 11/07* (2006.01)

(52) U.S. Cl.
CPC ..... *G05D 16/0619* (2013.01); *G05D 16/2013* (2013.01); *Y10T 137/86622* (2015.04)

(58) Field of Classification Search
CPC ......... Y10T 137/87217; F16K 11/0716; F16K 31/0163; F16K 31/06; F16K 31/0624; F16K 13/0613; F04B 27/1804; F04B 27/14; F04B 27/08; F04B 27/1813; F04B 27/1827
USPC ....... 137/625.65, 625.68, 596.17; 417/222.2; 251/335.3
See application file for complete search history.

(56) References Cited

U.S. PATENT DOCUMENTS

| | | | |
|---|---|---|---|
| 3,964,372 A * | 6/1976 | Chatterjea | F16D 48/0206 138/43 |
| 4,428,718 A | 1/1984 | Skinner | 417/222.2 |
| 4,795,134 A | 1/1989 | Lanfri | 251/335.3 |
| 6,010,312 A | 1/2000 | Suitou et al. | 417/222.2 |
| 6,062,823 A | 5/2000 | Kawaguchi et al. | 417/222.2 |
| 6,062,824 A | 5/2000 | Kimura | 251/129.02 |
| 6,142,445 A | 11/2000 | Kawaguchi | 251/129.15 |
| 6,146,106 A | 11/2000 | Suitou | 251/129.18 |
| 6,196,808 B1 | 3/2001 | Taguchi | 417/222.2 |
| 6,250,502 B1 | 6/2001 | Cote | 221/1 |
| 6,358,017 B1 | 3/2002 | Ota | 417/222.2 |
| 6,361,283 B1 | 3/2002 | Ota | 417/222.2 |
| 6,398,516 B1 | 6/2002 | Kawaguchi | 417/222.2 |
| 6,701,744 B1 * | 3/2004 | Yajima | F16K 31/0693 62/502 |
| 6,769,667 B2 | 8/2004 | Kume | 417/222.2 |
| 6,772,990 B2 | 8/2004 | Sasaki et al. | 417/222.2 |
| 6,783,332 B2 | 8/2004 | Umemura et al. | 417/222.2 |
| 6,927,656 B2 | 8/2005 | Iwata | 251/129.15 |
| 6,939,112 B2 | 9/2005 | Taguchi | 417/222.2 |
| 7,128,304 B2 | 10/2006 | Morisawa et al. | 251/129.18 |
| 7,523,620 B2 | 4/2009 | Umemura et al. | 62/228.3 |
| 7,533,687 B2 | 5/2009 | Uemura et al. | 137/375 |
| 7,559,208 B2 | 7/2009 | Ota et al. | 417/222.2 |
| 7,611,335 B2 | 11/2009 | Warren et al. | 417/222.2 |
| 7,644,729 B2 | 1/2010 | Cho et al. | 137/625.27 |
| 7,832,653 B2 * | 11/2010 | Yukimoto | F16K 47/04 236/92 B |
| 7,958,908 B2 | 6/2011 | Cho et al. | 137/625.26 |
| 8,021,124 B2 | 9/2011 | Umemura et al. | 417/222.2 |
| 8,052,064 B2 * | 11/2011 | Yukimoto | F25B 41/062 236/92 B |
| 8,079,827 B2 | 12/2011 | Iwa et al. | 417/222.2 |
| 8,152,482 B2 | 4/2012 | Umemura et al. | 417/222.2 |
| 8,251,673 B2 | 8/2012 | Taguchi | 417/222.2 |
| 8,651,826 B2 | 2/2014 | Futakuchi et al. | 417/222.2 |
| 9,132,714 B2 | 9/2015 | Futakuchi et al. | |
| 9,551,334 B2 | 1/2017 | Lee | |
| 9,732,874 B2 * | 8/2017 | Saeki | F04B 27/1804 |
| 2002/0027212 A1 * | 3/2002 | Johnson | B67D 3/045 251/126 |
| 2003/0145615 A1 | 8/2003 | Sasaki | 62/228.3 |
| 2003/0190238 A1 * | 10/2003 | Takai | F04B 27/1804 417/222.2 |
| 2004/0238772 A1 * | 12/2004 | Bachman | F02M 61/163 251/126 |
| 2008/0138213 A1 | 6/2008 | Umemura et al. | 417/222.2 |
| 2009/0108221 A1 | 4/2009 | Umemura et al. | 251/129.15 |
| 2009/0183786 A1 | 7/2009 | Iwa et al. | |
| 2010/0047105 A1 | 2/2010 | Bergstrom et al. | |
| 2012/0198992 A1 | 8/2012 | Futakuchi et al. | 91/505 |
| 2012/0251343 A1 | 10/2012 | Taguchi | 417/222.2 |
| 2014/0099214 A1 | 4/2014 | Fukudome et al. | 417/222.2 |
| 2017/0284562 A1 * | 10/2017 | Hayama | F16K 47/06 |

FOREIGN PATENT DOCUMENTS

| | | | |
|---|---|---|---|
| JP | 2011117396 A * | 6/2011 | ......... F04B 27/1804 |
| WO | WO2007119380 | 10/2007 | |
| WO | WO2011053460 | 5/2011 | |

OTHER PUBLICATIONS

Notification of Transmittal of Translation of the International Preliminary Report on Patentability (PCT/IB/338) dated Dec. 4, 2014, with International Preliminary Report on Patentability (PCT/IB/373) and Written Opinion of the International Searching Authority (PCT/ISA/237), for corresponding international application PCT/JP2013/063501.

\* cited by examiner

CAPACITY CONTROL VALVE

CROSS REFERENCE TO RELATED APPLICATIONS

This application is a continuation-in-part of U.S. patent application Ser. No. 14/384,045, filed Sep. 9, 2014, which is the US National Phase under 35 USC § 371 of International Application PCT/JP2013/063501, filed May 15, 2013, which claims priority to Japanese Patent Application No. 2012-118385, filed May 24, 2012. The International Application was published under. PCT Article 21(2) in a language other than English.

TECHNICAL FIELD

The present invention relates to a capacity control valve that variably controls the capacity or pressure of working fluid, and specifically to a capacity control valve that controls the discharge rate of a variable-capacity compressor, etc., used for an automobile air-conditioning system, etc., according to the pressure load.

BACKGROUND ART

A swashplate type variable-capacity compressor used for an automobile air-conditioning system, etc., comprises, for example, a rotational axis driven by the rotational force of an engine to turn; a swashplate connected to the rotational axis in a manner allowing for change in its inclination angle relative to the rotational axis; and a compression piston connected to the swashplate, wherein the inclination angle of the swashplate is changed to change the stroke of the piston and thereby control the discharge rate of refrigerant gas.

This inclination angle of the swashplate is continuously changed by utilizing the intake pressure in an intake chamber that takes in refrigerant gas, the discharge pressure in a discharge chamber that discharges refrigerant gas pressurized by the piston, and the control chamber pressure in a control chamber (crank chamber) that houses the swashplate, while also using a capacity control valve driven by electromagnetic force to open/close in order to control the pressure in the control chamber as deemed appropriate, thereby adjusting the balance of pressures acting upon both sides of the piston.

For such capacity control valve, one comprising the following, for example, is known, as shown in FIG. 4 (hereinafter referred to as "Prior Art 1"; refer to Patent Literature 1, for example) discharge-side passages 73, 77 communicating a discharge chamber and control chamber; a first valve chamber 82 formed along the discharge-side passages; intake-side passages 71, 72 communicating an intake chamber and the control chamber; a second valve chamber (actuation chamber) 83 formed along the intake-side passages; a valve element 81 where a first valve part 76 positioned in the first valve chamber 82 to open/close the discharge-side passages 73, 77 undergoes reciprocating motion integrally with a second valve part 75 positioned in the second valve chamber 83 to open/close the intake-side passages 71, 72, and the two valve parts open/close in opposite directions; a third valve chamber (capacity chamber) 84 formed along the intake-side passages 71, 72 at a position closer to the control chamber; a pressure-sensitive body (bellows) 78 positioned in the third valve chamber to apply a bias force in the extending (expanding) direction and also to contract as the surrounding pressure increases; a valve seat body (engagement part) 80 provided on the free end of the pressure-sensitive body in the expanding/contracting direction and having a circular seating surface; a third valve part (valve-opening connection part) 79 that moves integrally with the valve element 81 in the third valve chamber 84 and is able to open/close the intake-side passages by engaging with and separating from the valve seat body 80; and a solenoid S that applies an electromagnetic drive force to the valve element 81.

The capacity control valve 70 is also designed in such a way that, if a need arises during capacity control to change the control chamber pressure on the variable-capacity compressor, the discharge chamber and control chamber can be connected to allow for adjustment of the pressure in the control chamber (control chamber pressure) Pc, without having to provide a clutch mechanism on the compressor. Additionally, its constitution is such that, if the control chamber pressure Pc rises while the variable-capacity compressor is stopped, the third valve part (valve-opening connection part) 79 is separated from the valve seat body (engagement part) 80 to open the intake-side passages and thereby communicate the intake chamber and control chamber.

On the capacity control valve 70 thus constituted, the relational expression of the force of each installed spring that generates a snapping force, and the balancing force generated by the pressure of working fluid that flows in, is given by Pc (Ab−Ar1)+Pc (Ar1−As)+Pd (As−Ar2)+Ps (Ar2−Ar1)+Ps×Ar1=Fb+S1−Fsol, based on the constitution shown in FIG. 4. This relational expression can be organized as Pc (Ab−As)+Pd (As−Ar2)+Ps×Ar2=Fb+S1−Fsol.

Then, assuming the relationship of pressure-receiving areas including the effective pressure-receiving area Ab of the pressure-sensitive body (bellows) 78, seal pressure-receiving area As of the first valve part 76, and pressure-receiving area Ar2 of the second valve part 75, to be Ab=As=Ar2, the above expression can be rewritten as Ps×Ar2=Fb+S1−Fsol.

In other words, by making the effective pressure-receiving area Ab of the pressure-sensitive body (bellows) 78, seal pressure-receiving area As of the first valve part 76, and pressure-receiving area Ar2 of the second valve part 75 identical or roughly identical, the control accuracy of the capacity control valve 1 will improve because only the intake pressure Ps flowing from the intake-side passage 71 acts upon the valve element 81.

The symbols in the aforementioned expression are as follows:

Ab - - - Effective pressure-receiving area of the pressure-sensitive body (bellows) 78

Ar1 - - - Pressure-receiving area (cross-section area) of the third valve part 79

As - - - Seal pressure-receiving area of the first valve part 76

Ar2 - - - Pressure-receiving area of the second valve part 75

Fb - - - Snapping (spring) force of the pressure-sensitive body (bellows) (overall)

S1 - - - Spring (snapping) means 85

Fsol - - - Electromagnetic force of the electromagnetic coil

Ps - - - Intake pressure

Pd - - - Discharge pressure

Pc - - - Control pressure (crank chamber pressure)

As described above, to achieve a capacity control valve of good control accuracy, the relationship of pressure-receiving areas including the effective pressure-receiving area Ab of the pressure-sensitive body 78, seal pressure-receiving area As of the first valve part 76, and pressure-receiving area Ar2 of the second valve part 75, must be Ab=As=Ar2, and therefore it can be said that the diameter of the capacity control valve is determined by the diameter of the pressure-sensitive body 78 or diameter of the valve element 81.

In Prior Art 1, the pressure-sensitive body 78 hermetically connects one end of a metal bellows 78A to a partition adjustment part 86 and connects the other end to the valve seat body 80, and a coil spring 87 is housed in the bellows 78A. This bellows 78A is made of phosphor bronze to achieve good workability, but from the viewpoint of spring property, phosphor bronze has a small yield stress as a material itself and cannot ensure a long stroke, and also a bellows made of phosphor bronze tends to undergo characteristic changes such as drop in load when an excessive pressure is applied or during use at high temperature, which makes it impossible to reduce the diameter or eliminate the coil spring 87. To reduce the diameter of a phosphor bronze bellows, the thickness of the bellows must be increased and its length also increased in order to ensure long-enough stroke, meaning that a length dimension greater than the overall length of the current bellows is needed, which could result in poor formability and might also cause the bellows to project from the outer diameter dimension of the compressor because the overall length in the axial direction must be extended. For these reasons, the diameter of the valve element 81 must be increased in order to ensure the "maximum flow rate (valve full-open flow rate)" which is an important characteristic required of a capacity control valve. In other words, producing the bellows 78A using phosphor bronze makes it impossible to ensure a long stroke and therefore necessitates increasing the diameter of the pressure-sensitive body 78 and that of the valve element 81, and also in light of the tendency of such bellows to undergo characteristic changes, the coil spring 87 must be included, and consequently the diameter of the capacity control valve increases.

On the other hand, it is proposed that a control valve of simple structure comprising a pressure-sensitive unit provided in a solenoid unit be obtained by designing the pressure-sensitive unit with a movable end formed on one end of a bellows using strong magnetic material and a fixed end formed on the other end of the bellows using strong magnetic material, and by opposingly positioning the movable end and fixed end inside the bellows with a specified gap provided in between so that the movable end and fixed end form a magnetic circuit for the solenoid unit; wherein such control valve is such that the bellows is formed with stainless material by considering the joining property of the movable end and fixed end formed with strong magnetic material (hereinafter referred to as "Prior Art 2," refer to Patent Literature 2).

However, the invention of Prior Art 2 was developed with the object of allowing the components of the pressure-sensitive unit to also function as the components of the solenoid unit because the magnetic circuit for the solenoid unit is formed in the pressure-sensitive unit, thereby simplifying the structure and helping reduce the cost, while also making it easy to assemble the control valve, and furthermore the idea of forming the bellows with stainless material is simply a way to achieve good joining property of the movable end and fixed end formed with strong magnetic material and it does not reduce the diameter of the capacity control valve, and consequently the diameter of the capacity control valve, including the outer diameter of the coil, remains large.

CITATION LIST

Patent Literatures

Patent Literature 1: International Patent Laid-open No. 2007/119380

Patent Literature 2: Japanese Patent Laid-open No. 2011-117396

SUMMARY OF INVENTION

Technical Problem

The present invention was developed to solve the problems of Prior Arts 1 and 2 mentioned above, and the object of the present invention is to provide a capacity control valve which has no internal spring positioned in the bellows of the pressure-sensitive unit and also reduces the diameter of the valve element and that of the bellows to achieve size reduction and weight reduction.

Solution to Problem

To achieve the aforementioned object, firstly the capacity control valve proposed by the present invention comprises:

discharge-side passages communicating a discharge chamber that discharges fluid and a control chamber that controls the discharge rate of fluid;

a first valve chamber formed along the discharge-side passages;

intake-side passages communicating an intake chamber that takes in fluid and the control chamber;

a second valve chamber formed along the intake-side passages;

a valve element that integrally has a first valve part that opens/closes the discharge-side passages in the first valve chamber and a second valve part that opens/closes the intake-side passages in the second valve chamber, where the two valve parts open/close in opposite directions due to reciprocating motion;

a third valve chamber formed along the intake-side passages at a position closer to the control chamber than to the second valve chamber;

a pressure-sensitive body positioned in the third valve chamber to apply, by extending, a bias force in the direction of opening the first valve part, and also to contract as the surrounding pressure increases;

an adapter provided on the free end of the pressure-sensitive body in the extending/contracting directions, and having a circular seating surface;

a third valve part that moves integrally with the valve element in the third valve chamber, and has a circular engagement surface that opens/closes the intake-side passages by engaging with and separating from the seating surface of the adapter; and a solenoid that applies an electromagnetic drive force to the valve element in the direction of closing the first valve part;

wherein such capacity control valve is characterized in that:

the pressure-sensitive body is formed by a formed bellows made of material having greater yield stress than phosphor bronze; and the formed bellows has its diameter set smaller and its stroke longer than the diameter and stroke of a phosphor bronze bellows.

According to these features, the diameter of the bellows and that of the valve element can be reduced and response of the valve element can be improved, while at the same time the diameter of the valve body can be reduced. Furthermore, the diameter of the capacity control valve containing the solenoid can be reduced and consequently the capacity control valve can be made lighter and more space-saving. Eventually, such capacity control valve can contribute to the size reduction and weight reduction of a swashplate-type variable-capacity compressor and weight reduction of a vehicle, thus helping provide environmentally friendly products. Additionally, a smaller bellows diameter leads to a smaller adapter diameter, which in turn improves the vibration resistance of the bellows and also improves the vibration resistances of other movable parts as a result of reduced weights of the parts due to diameter reduction. All these can ultimately contribute to improved durability.

Secondly, the capacity control valve proposed by the present invention is characterized in that, in the first feature, the pressure-sensitive body is preferably formed with austenitic stainless material.

According to these features, a pressure-sensitive body having high spring property and yield stress and suitable for diameter reduction can be obtained.

Thirdly, the capacity control valve proposed by the present invention is characterized in that, in the first or second features, the adapter provided on the free end of the formed bellows and partition adjustment member provided on the fixed end are formed with non-magnetic material.

Fourthly, the capacity control valve proposed by the present invention is characterized in that, in the third feature, the partition adjustment member is preferably formed with austenitic stainless material.

According to the third and fourth features, good sliding property is achieved when the pressure-sensitive body is press-fit into the valve body via the partition adjustment member, which leads to ease of manufacturing.

Fifthly, the capacity control valve proposed by the present invention is characterized in that, in the third or fourth feature, the formed bellows, adapter, and partition adjustment member are fixed by means of electron beam welding, and the interior of the formed bellows is kept in an absolute vacuum state.

According to these features, the interior of the formed bellows can be kept in an absolute vacuum state by utilizing the advantages of electron beam welding, which in turn makes it possible to sense the absolute intake pressure and which thereby improves the sensing accuracy. Also because the bellows, partition adjustment member, and adapter, all formed with the same non-magnetic material, are fixed by means of electron beam welding, welding becomes easy and welding reliability can be improved.

Advantageous Effects of Invention

The present invention has excellent effects as described below:

(1) The pressure-sensitive body is formed by a formed bellows made of material having greater yield stress than phosphor bronze, and the formed bellows has its diameter set smaller and its stroke longer than the diameter and stroke of a phosphor bronze bellows, and therefore the diameter of the bellows and that of the valve element can be reduced and also the response of the valve element can be improved and also the diameter of the valve body can be reduced. Furthermore, the diameter of the capacity control valve containing the solenoid can be reduced and consequently the capacity control valve can be made lighter and more space-saving. Eventually, such capacity control valve can contribute to the size reduction and weight reduction of a swashplate-type variable-capacity compressor and weight reduction of a vehicle, thus helping provide environmentally friendly products. Additionally, a smaller bellows diameter leads to a smaller adapter diameter, which in turn improves the vibration resistance of the bellows and also improves the vibration resistances of other movable parts as a result of reduced weights of the parts due to diameter reduction. All these reductions can ultimately contribute to improved durability.

(2) The pressure-sensitive body is preferably formed with austenitic stainless material such that a pressure-sensitive body having high spring property and yield stress and which is suitable for diameter reduction can be obtained.

(3) The adapter provided on the free end of the formed bellows and partition adjustment member provided on the fixed end are formed with non-magnetic material, and the partition adjustment member is preferably formed with austenitic stainless material, and therefore good sliding property is achieved when the pressure-sensitive body is press-fit into the valve body via the partition adjustment member, which leads to ease of manufacturing.

(4) The formed bellows, adapter, and partition adjustment member are fixed by means of electron beam welding, and the interior of the formed bellows is kept in an absolute vacuum state, and since the interior of the formed bellows can be kept in an absolute vacuum state by utilizing the advantages of electron beam welding, it becomes possible to sense the absolute intake pressure and the sensing accuracy improves as a result. Also because the bellows, partition adjustment member, and adapter, all formed with the same non-magnetic material, are fixed by means of electron beam welding, welding becomes easy and welding reliability can be improved.

DESCRIPTION OF EMBODIMENTS

Figure 1:
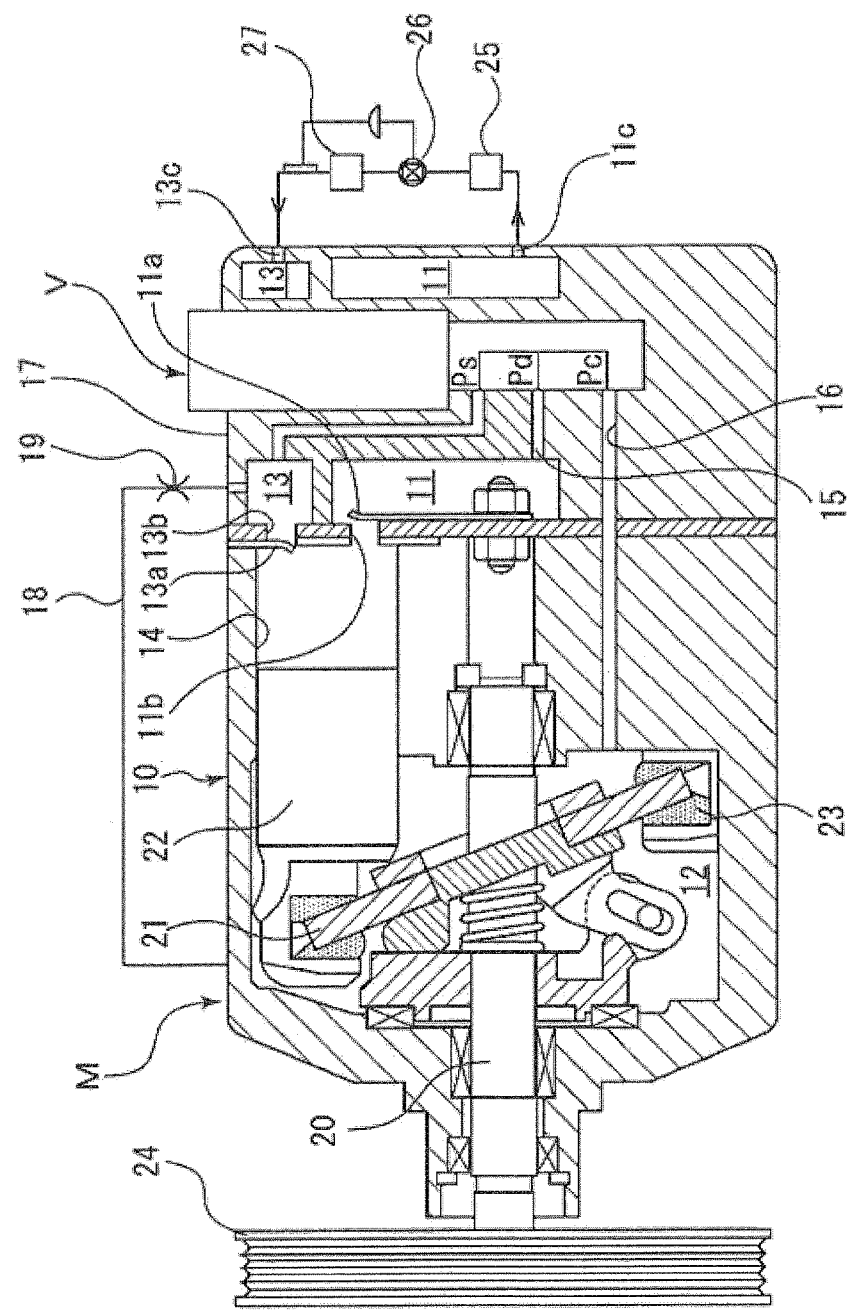
FIG. 1 This is a schematic block diagram showing a swashplate-type variable-capacity compressor equipped with a capacity control valve conforming to the present invention.

A mode for carrying out a capacity control valve pertaining to the present invention is explained in detail by referring to the drawings, but it should be noted that interpretations of the present invention are not at all limited to the following, and various changes, modifications, and improvements can be added based on the knowledge of those skilled in the art so long as they do not deviate from the scope of the present invention.

As shown in FIG. 1, a swashplate-type variable-capacity compressor M comprises, for example: a casing 10 that defines a discharge chamber 11, a control chamber (also referred to as "crank chamber") 12, an intake chamber 13, multiple cylinders 14, a port 1lb that communicates each cylinder 14 and the discharge chamber 11 and is opened/closed by a discharge valve 11a, a port 13b that communicates each cylinder 14 and the intake chamber 13 and is opened/closed by an intake valve 13a, a discharge port 11c and intake port 13c connected to an external cooling circuit, a connection passage 15 that serves as a discharge-side passage communicating the discharge chamber 11 and control chamber 12, a connection passage 16 that serves as the discharge-side passage and also as an intake-side passage communicating the control chamber 12 and intake chamber 13; and a connection passage 17 that serves as an intake-side passage, etc.; a rotational axis 20 projecting outward from inside the control chamber (crank chamber) 12 in a freely rotatable manner; a swashplate 21 that turns integrally with the rotational axis 20 and is connected in a manner allowing for change in its inclination angle relative to the rotational axis 20; multiple pistons 22 engaged in the respective cylinders 14 in a manner freely undergoing reciprocating motion; multiple connection members 23 connecting the swashplate 21 and respective pistons 22; a driven pulley 24 installed on the rotational axis 20; and a capacity control valve V conforming to the present invention which is embedded in the casing 10.

Also, the swashplate-type variable-capacity compressor M has a connection passage 18 that directly communicates the control chamber (crank chamber) 12 and intake chamber 13, where a fixed orifice 19 is provided in the connection passage 18.

Furthermore, this swashplate-type variable-capacity compressor M has a cooling circuit connected to the discharge port 11c and intake port 13c, and a condenser 25, expansion valve 26, and evaporator 27 are sequentially provided in this cooling circuit.

Figure 2:
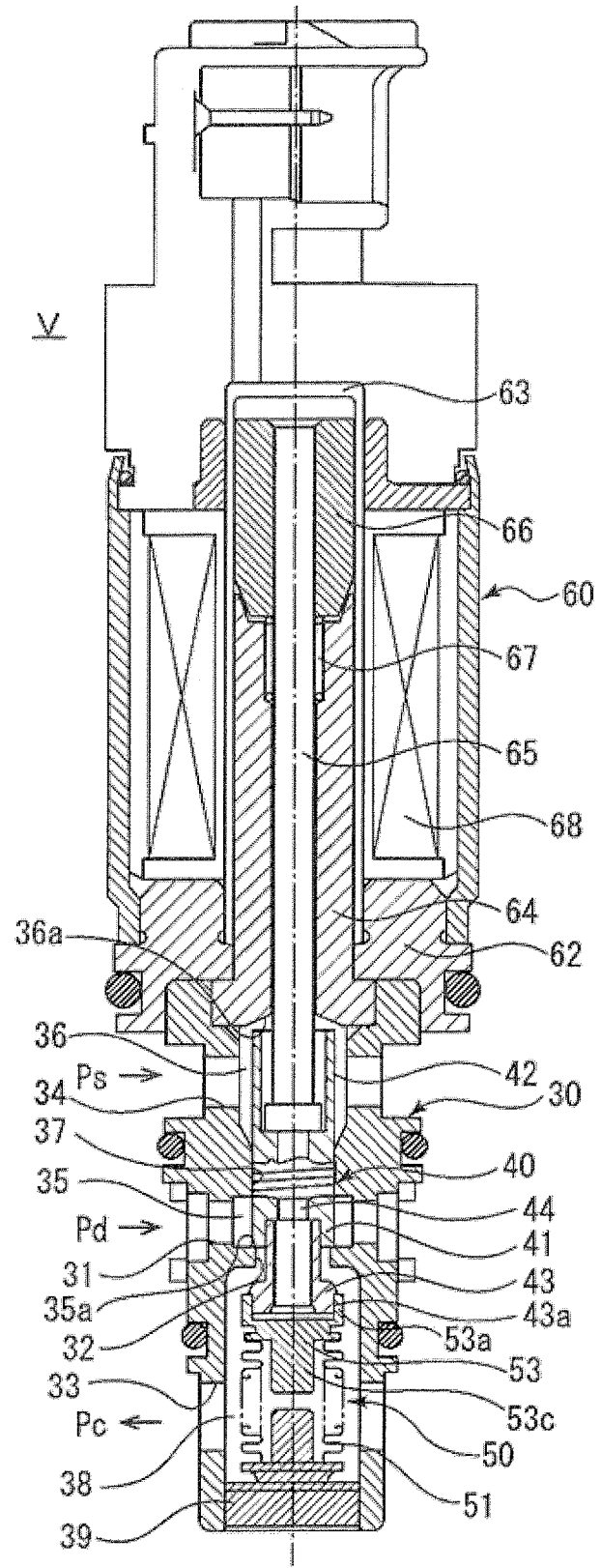
FIG. 2 This is a longitudinal section view showing an overview of the capacity control valve pertaining to an embodiment of the present invention.

As shown in FIG. 2, the capacity control valve V comprises, for example: a valve body 30 formed with metal material or resin material; a valve element 40 positioned in the valve body 30 in a manner freely undergoing reciprocating motion; a pressure-sensitive body 50 that biases the valve element 40 in one direction; and a solenoid 60 connected to the valve body 30 and applying an electromagnetic drive force to the valve element 40.

The solenoid 60 comprises, for example: a casing 62 connected to the valve body 30; a sleeve 63 having one end closed; a cylindrical fixed iron core 64 positioned on the interior side of the casing 62 and sleeve 63; a driving rod 65 forming a connection passage 44 on the interior side of the fixed iron core 64 in a manner freely undergoing reciprocating motion, with its tip connected to the valve element 40; a movable iron core 66 bonded to the other end of the driving rod 65; a coil spring 67 that biases the movable iron core 66 in the direction of opening a first valve part 41; and an excitation coil 68 wound on the exterior side of the sleeve 63 via a bobbin.

The valve body 30 comprises, for example: connection passages 31, 32, 33 that function as discharge-side passages; connection passages 33, 34 that function as intake-side passages together with the connection passage 44 of the valve element 40 described later; a first valve chamber 35 formed along the discharge-side passages; a second valve chamber 36 formed along the intake-side passages; a guide passage 37 that guides the valve element 40; and a third valve chamber 38 formed along the discharge-side passages and intake-side passages at a position closer to the control chamber 12. Also, a partition adjustment member 39 that defines the third valve chamber 38 and also constitutes a part of the valve body 30 is press-fit into the valve body 30.

In other words, the connection passage 33 and third valve chamber 38 are formed in a manner also serving as a part of the discharge-side passages and intake-side passages, while the connection passage 32 communicates the first valve chamber 35 and third valve chamber 38 and also forms a valve hole through which the valve element 40 is inserted (gaps through which fluid flows are ensured as the valve element 40 is inserted). Note that the connection passages 31, 33, 34 are each provided in a multiple number (such as four at 90-degree intervals) and positioned radially in the circumferential direction.

Also, in the first valve chamber 35, a seating surface 35a on which the first valve part 41 of the valve element 40 described later is seated is formed on the rim of the connection passage (valve hole) 32, while, in the second valve chamber 36, a seating surface 36a on which the second valve part 42 of the valve element 40 described later is seated is formed at the edge of the fixed iron core 64 described later.

The valve element 40 is formed in an approximate cylinder shape and comprises, for example: a first valve part 41 on one end; a second valve part 42 on the other end; a third valve part 43 connected as an add-on to a side opposite to the second valve part 42 side by sandwiching the first valve part 41 in between; and a connection passage 44 that penetrates from the second valve part 42 to the third valve part 43 in the axial direction and functions as an intake-side passage.

The third valve part 43 is formed in a manner flaring from a diameter-reduced state from the first valve chamber 35 toward the third valve chamber 38 and is guided through the connection passage (valve hole) 32, and also comprises a circular engagement surface 43a opposingly facing the adapter 53 described later on its outer periphery rim.

The pressure-sensitive body 50 comprises a bellows 51, adapter 53 and partition adjustment member 39, for example. The bellows 51 is fixed on one end to the partition adjustment member 39 and retains the adapter 53 on the other end (free end).

Figure 3:
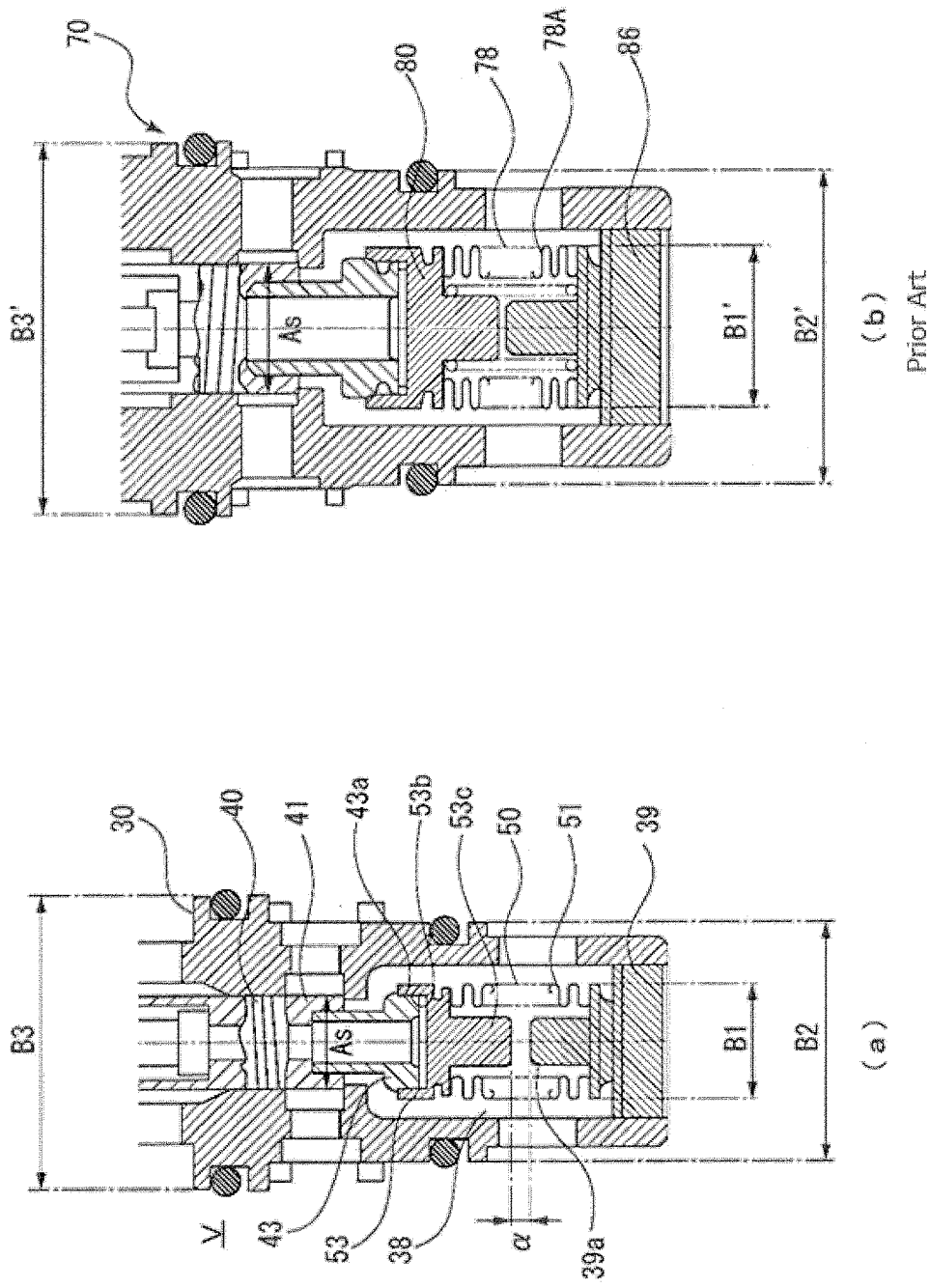
FIG. 3 These are enlarged views of pressure-sensitive bodies of capacity control valves, where (a) shows the capacity control valve pertaining to an embodiment of the present invention, while (b) shows the capacity control valve in Prior Art 1.

As shown in FIG. 3, the adapter 53 has a hollow cylindrical part 53a whose tip engages with the third valve part 43 and whose cross-section has an approximate C shape, as well as a bulging part 53c that bulges into the bellows 51, and a circular seating surface 53b that opposingly engages with and separates from the engagement surface 43a of the third valve 43 is provided at the tip of the hollow cylindrical part 53a.

The pressure-sensitive body 50 is positioned in the third valve chamber 38 to apply, by extending (expanding), a bias force in the direction of opening the first valve part 41, and also to contract as the surrounding pressure (in the third valve chamber 38 and connection passage 44 of the valve element 40) increases, thereby actuating to weaken the bias force applied to the first valve part 41.

FIG. 3 shows enlarged views of pressure-sensitive bodies of capacity control valves, where (a) shows the capacity control valve pertaining to the embodiment of the present invention, while (b) shows the capacity control valve in Prior Art 1.

In FIG. 3, the bellows 51 of the pressure-sensitive body 50 in the capacity control valve V pertaining to the embodiment of the present invention shown in (a) is formed by a formed bellows made of material having greater yield stress than phosphor bronze, or, for example, preferably by a formed bellows made of austenitic stainless material, where the bellows 51 has its diameter set smaller and its stroke longer than the diameter and stroke of the phosphor bronze bellows 78A under Prior Art 1 shown in (b). Also, while the pressure-sensitive body 78 under Prior Art 1 has a coil spring 87 in the bellows 78A, no internal spring or other such member is provided in the bellows 51 of the pressure-sensitive body 50 under the present invention. Furthermore, the gap a between the end of the bulging part 39$a$ that bulges into the bellows 51 of the partition adjustment member 39 on one hand, and the end of the bulging part 53$c$ that bulges into the bellows 51 of the adapter 53 on the other, is set larger than the corresponding gap under Prior Art 1.

One end (fixed end) of the bellows 51 is fixed to the partition adjustment member 39, while the adapter 53 is retained at the other end (free end), where the partition adjustment member 39, and adapter 53 are formed with non-magnetic material. The partition adjustment member 39 is preferably formed with austenitic stainless material.

The bellows 51, partition adjustment member 39, and adapter 53 are fixed by means of electron beam welding and the interior of the formed bellows is kept in an absolute vacuum state.

The formed bellows pertaining to the embodiment of the present invention, made of material having greater yield stress than phosphor bronze, has higher spring property compared to the phosphor bronze bellows and thus allows the internal spring to be eliminated and diameter B1 of the bellows 51 to be reduced, and because its yield stress itself is also high, a longer stroke can be provided. Even when the diameter of the valve element 40 is reduced, therefore, a long stroke can be provided to compensate for the smaller degree of opening of the valve element 40, effectively permitting diameter reduction of the valve element 40 and improving the response of the valve element 40. Because the diameter of the valve element 40 can be reduced, the diameter B2 of the valve body 30 can also be reduced. Furthermore, the diameter B3 of the capacity control valve V containing the solenoid 60 can also be reduced, which makes the capacity control valve lighter and more space-saving. This space-saving design also contributes to the size reduction and weight reduction of a swashplate-type variable-capacity compressor M and weight reduction of a vehicle, thus helping provide environmentally friendly products.

Furthermore, a smaller bellows 51 diameter leads to a smaller adapter 53 diameter, which in turn improves the vibration resistance of the bellows 51 and also improves the vibration resistances of other movable parts as a result of reduced weights of the parts due to diameter reduction. All these can ultimately contribute to improved durability.

When the capacity control valve V pertaining to an embodiment of the present invention is compared with the capacity control valve 70 under Prior Art 1, the following are found:

Bellows diameter $B1/B1'=5.95/7.9=0.75$

Valve body diameter $B2/B2'=14.9/18.8=0.79$

Capacity control valve diameter $B3/B3'=21.7/23.6=0.92$

As the figures show, the diameters are significantly smaller.

Additionally, since the valve body 30 is normally made of brass, use of phosphor bronze for the pressure-sensitive body 78 under Prior Art 1 results in the two parts having similar hardness and consequently, poor sliding property when the partition adjustment part 86 is press-fit into the valve body 30. On the other hand, the capacity control valve V pertaining to an embodiment of the present invention allows its partition adjustment member 39, and adapter 53 to be formed with non-magnetic material instead of strong magnetic material as in Prior Art 2, and therefore when at least the partition adjustment member 39 is formed with austenitic stainless material, greater sliding property is achieved when the partition adjustment member 39 is press-fit into the valve body 30 because both have a different hardness, and ease of manufacturing is ensured as a result.

Furthermore, the capacity control valve V pertaining to an embodiment of the present invention is such that the bellows 51, partition adjustment member 39, and adapter 53 are fixed by means of electron beam welding, and by positioning the cathode in the formed bellows, the interior of the formed bellows can be kept in an absolute vacuum state when the parts are welded, and this allows for sensing of the absolute intake pressure Ps and improves the sensing accuracy compared to when the interior of the bellows is simply kept in negative pressure as is the case of Prior Art 2. Also, because the bellows 51, partition adjustment member 39, and adapter 53 can be formed with the same stainless material, stable production is possible by means of electron beam welding and the reliability improves as a result.

The foregoing explained an embodiment of the present invention by referring to the drawings, but specific constitutions are not at all limited to the embodiment and the present invention also includes changes and additions made to the extent that they do not deviate from the gist of the present invention.

For example, the aforementioned embodiment cited austenitic stainless material as a favorable material for the pressure-sensitive body because it has greater yield stress than phosphor bronze and therefore demonstrates higher spring property and yield stress and is suitable for diameter reduction. However, the material is not at all limited to the foregoing and ferritic stainless material may be used, as well.

Also in the aforementioned embodiment, the partition adjustment member and adapter were formed with non-magnetic material, for example. However, their material is not at all limited to the foregoing and, if the pressure-sensitive body uses ferritic stainless material, the same material may be used, as well.

Figure 5:
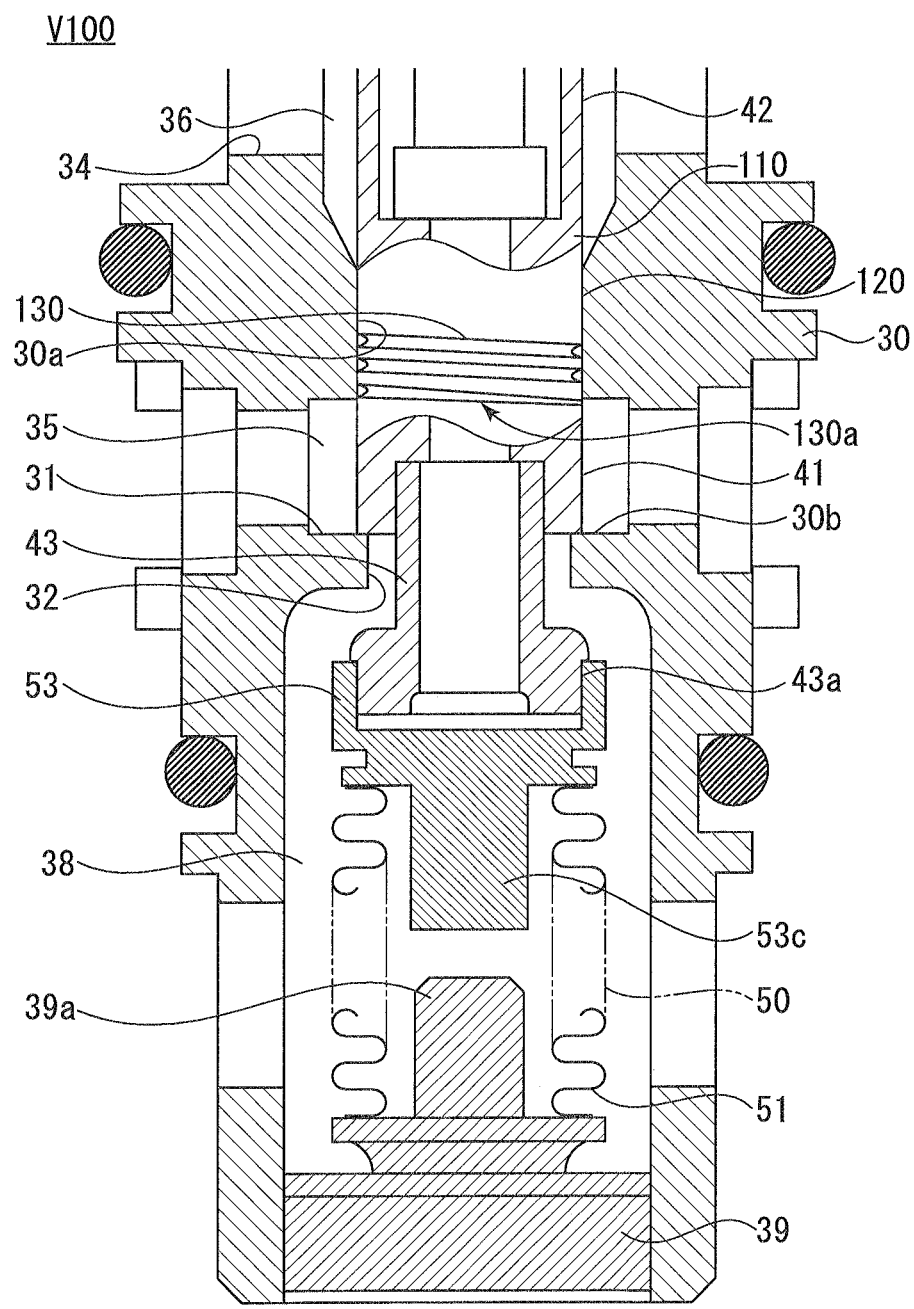
FIG. 5 This is an enlarged section view of the capacity control valve pertaining to another embodiment of the present invention, showing a position of the screw grooves when the first valve part is closed.
Figure 6:
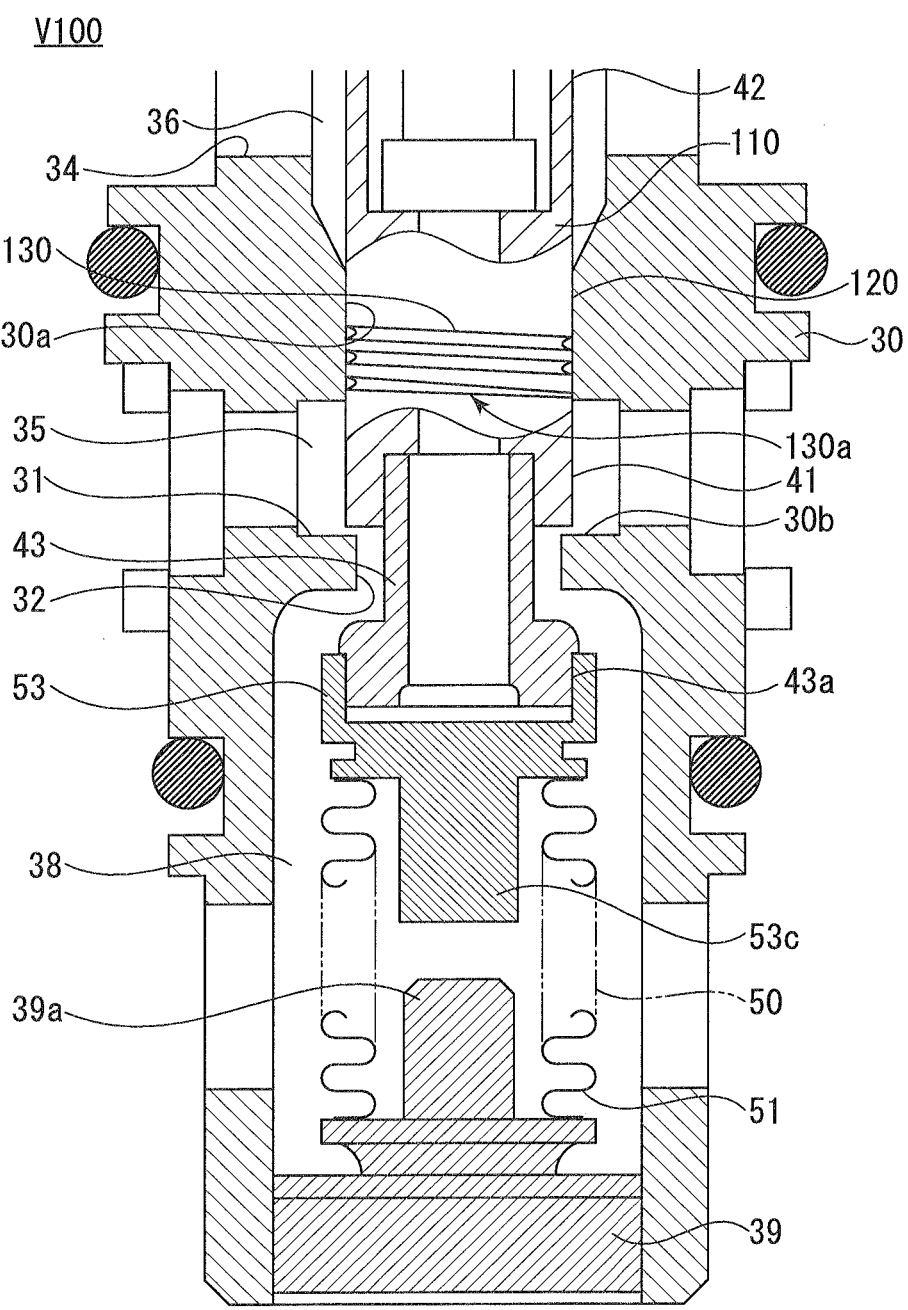
FIG. 6 This is an enlarged section view of the capacity control valve pertaining to said another embodiment of the present invention, showing a position of the screw grooves when the first valve part is opened.

FIG. 5 and FIG. 6 are diagrams showing an enlarged section of the capacity control valve pertaining to the second example of the present invention. In the explanation below, the example shown in FIG. 1, FIG. 2 and FIG. 3(*a*) is referred to as first example, and the example shown in FIG. 5 and FIG. 6 is referred to as second example. FIG. 5 and FIG. 6 are enlarged section views for showing difference with the first example, which show positions of the valve element when the first valve part is closed and when the first valve part is opened, respectively. In explanation of the second example, a component identical to that of the first example is designated with the same sign, and an explanation thereof is omitted to avoid an overlapping explanation, and mainly, portions different from the first example are explained.

In FIG. 5 and FIG. 6, the capacity control valve V100 representing the second example comprises, for example, a valve element 110, a pressure-sensitive body 50 and a solenoid 60. The valve element 110 integrally has a first valve part 41 that opens/closes connection passages 31 and 32 as discharge-side passages in a first valve chamber 35 and a second valve part 42 that opens/closes a connection passage 34 as an intake-side passage in a second valve chamber 36, where the two valve parts open/close in opposite directions due to reciprocating motion.

Needless to say, the valve element 110 is also driven by an electromagnetic drive force of a solenoid 60 shown in FIG. 2 (illustration omitted in FIG. 5 and FIG. 6), so as to be moved to the side of the pressure-sensitive body 50 as in the first example.

The valve element 110 is accommodated in a valve body 30 so as to be allowed a reciprocating motion, and cooperate with the valve body 30 to define the first valve chamber 35 and the second valve chamber 36. The valve element 110 is located between the first valve chamber 35 and the second valve chamber 36, and has an outer circumferential face part 120 which is slidably movable relative to an inner circumferential face 30a of the valve body 30. On this outer circumferential face part 120, multiple-thread screw grooves 130 are formed.

Figure 4:
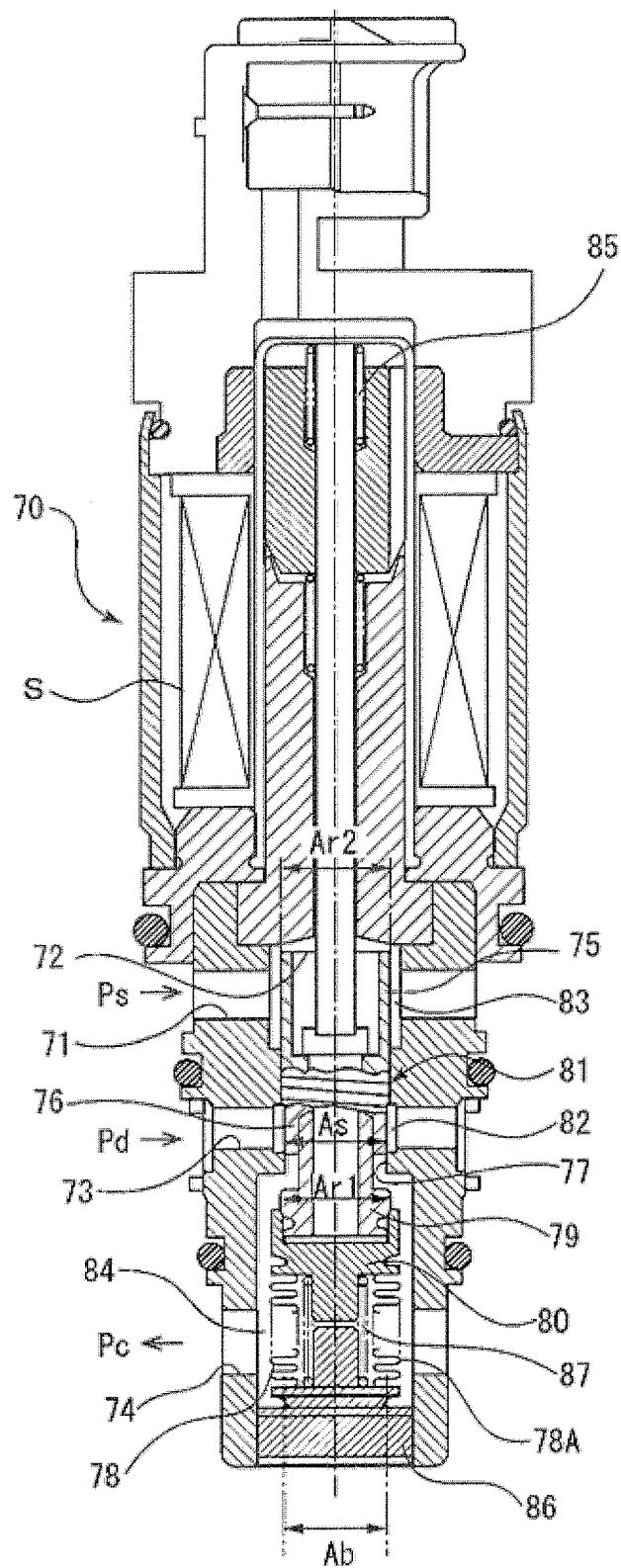
FIG. 4 This is a longitudinal section view showing an overview of the capacity control valve in Prior Art 1.

In the second example shown in FIG. 5 and FIG. 6, the pressure-sensitive body 50 is a springless type pressure-sensitive body which is not provided with a spring for biasing the valve element 110 toward the side of the solenoid 60, similarly as in the first example shown in FIG. 1, FIG. 2, and FIG. 3(a), the springless type referring to such a type that is not provided with the spring 87 in the conventional capacity control valve shown in FIG. 3(b) and FIG. 4.

In the second example in which such a springless type pressure-sensitive body 50 is used, it is possible to make the bias force against the valve element 110 comparatively small, by keeping the interior of the bellows 51 in a vacuum state. As a result, it is possible to reduce the electromagnetic drive force of the solenoid 60 and achieve an energy-saving effect. However, on the other hand, there is a possibility that, when released from the electromagnetic drive force of the solenoid 60, the valve element 110 becomes hard to be brought back to the side of the solenoid 60 by a comparative small bias force of the bellows 51. Specifically, between the outer circumferential face part 120 of the valve element 110 and the inner circumferential face 30a of the valve body 30, an adhesive force is partially generated between the outer circumferential face part 120 and the inner circumferential face 30a, due to an eccentricity. As a result, a frictional force gives a comparatively significant influence to a relative movement of the valve element 110 and the valve body 30. In such a case, the valve element 110 receives the comparatively significant influence of the adhesive force or the frictional force between the outer circumferential face part 120 and the inner circumferential face 30a of the valve body 30, causing a poor functioning that the valve element 110 becomes hard to move. In order to sort out this poor functioning, the capacity control valve V100 is provided with the screw grooves 130 that is an important feature of the present invention.

As shown in FIG. 5, when the first valve part 41 is closed, each of the screw grooves 130 communicates with the first valve chamber 35 and does not communicate with the second valve chamber 36. Meanwhile, as shown in FIG. 6, when the first valve part 41 is opened, each of the screw grooves 130 communicates neither with the first valve chamber 35 nor the second valve chamber 36.

In this connection, the closed state of the first valve part 41 is a state where the first valve part 41 is seated on the valve seat 30b as shown in FIG. 5, and the open state is a state where the first valve part 41 is separated from the valve seat 30b as shown in FIG. 6.

In the second example shown in FIG. 5 and FIG. 6, the screw grooves 130 are provided in two threads, in a position equally spaced in the circumferential direction. In other words, when the first valve part 41 is closed, the screw grooves 130 of two threads each communicate with the first valve chamber 35 at a position 180° turned around the central axis of the valve element 110.

At least one end in the side of the first valve chamber 35 of each of the screw grooves 130 is an incomplete screw part 130a. The incomplete screw part 130a refers to an end of a screw groove in which a depth and a width of a screw groove 130 is gradually reduced toward the screw end.

In the second example, a length of the incomplete screw part 130a is set such that when the first valve part 41 is closed, only the incomplete screw part 130a in a screw groove 130 opens to the first valve chamber 35 to communicate with the first valve chamber 35, as shown in FIG. 5.

On the other hand, the end in the side of the second valve chamber 36 of a screw groove 130 may be an incomplete screw part, though not illustrated.

The capacity control valve V100 configured as described above not only naturally has the effects similar to those of the capacity control valve V1 of the first example shown in FIG. 1, FIG. 2 and FIG. 3(a), but further has the following effects.

When the solenoid 60 applies an electromagnetic drive force to the valve element 110, and the valve element 110 moves to the side of the pressure-sensitive body 50, the first valve chamber 35 is closed. At this time, the incomplete screw parts 130a of the screw grooves 130 open to the first valve chamber 35 so that the first valve chamber 35 communicates with the screw grooves 130, and the screw grooves 130 are filled with a working fluid in the first valve chamber 35.

Next, when the electromagnetic drive force of the solenoid 60 is removed, the valve element 110 is to be moved toward the side of the solenoid 60 by an extension (expansion) of the pressure-sensitive body 50. At this time, there is a concern that the valve element 110 becomes hard to be moved due to a comparatively significant influence of an adhesive force and a frictional force between the outer circumferential face part 120 and the inner circumferential face 30a of the valve body 30. However, the working fluid, which filled the screw grooves 130 when the first valve part 41 is closed, is not discharged from the screw grooves 130, since when the first valve part 41 is opened, the screw grooves 130 have no communication with the first valve chamber 35, and the working fluid is taken between the inner circumferential face 30a of the valve body 30 and the outer circumferential face part 120 of the valve element 110 to allow a high pressure to be maintained over the entire circumference. As a result, a lubricating effect of the working fluid in the screw grooves 130 reduces the adhesive force and the frictional force between the inner circumferential face 30a of the valve body 30 and the outer circumferential face part 120 of the valve element 110. Accordingly, even a weak bias force of the pressure-sensitive body 50 to the valve element 110 can smoothly move the valve element 110 to the side of the solenoid 60, and can surely open the first valve part 41 to a targeted degree of opening.

In addition, since the screw grooves 130 are provided in a position equally spaced in the circumferential direction, it is possible to capture the working fluid of the first valve chamber 35 evenly between the valve element 110 and the valve body 30, and it is possible to reduce the frictional force between the inner circumferential face 30a of the valve body 30 and the outer circumferential face part 120 of the valve element 110 uniformly in the circumferential direction.

Furthermore, since at least one end in the side of the first valve chamber 35 of each of the screw grooves 130 is the incomplete screw part 130a, it is possible to reduce a level difference of the screw groove 130 relative to the outer circumferential face part 120 of the valve element 110, in the incomplete screw part 130a. As a result, at a start of movement of the valve element 110, it is possible to control a rapid change of pressure of the working fluid, in the level difference of the incomplete screw part 130a which opens to the first valve chamber 35.

In addition, since the incomplete screw part 130a is formed at the end in the side of the first valve chamber of the screw grooves 130 as described above, when the valve element 110 is moved from the direction of closing the first valve chamber 35 to the direction of opening the first valve chamber 35, it is possible to inhibit the working fluid in the screw grooves 130 from being discharged to the first valve chamber 35, and accordingly, a sufficient lubricating effect by a high pressure working fluid is secured between the inner circumferential face 30a of the valve body 30 and the outer circumferential face part 120 of the valve element 110.

Furthermore, when the first valve part 41 is closed, each of the screw grooves 130 communicates with the first valve chamber 35, in such a manner that only the incomplete screw part 130a in the end in the side of the first valve chamber 35 opens to the first valve chamber 35. Therefore, it is possible to further control the above-described rapid change of the working fluid at a start of movement of the valve element 110 and the discharge of the working fluid in the screw grooves 130 to the first valve chamber 35 when the first valve chamber is opened, and accordingly, it is possible to further ensure the improvement in lubricating performance.

Incidentally, the capacity control valve pertaining to the present invention should not be limited to those in the second example shown in FIG. 5 and FIG. 6, and other modified modes are naturally included in the scope of the present invention, so long as they are in a scope not deviate from the gist of the present invention.

REFERENCE SIGNS LIST

10 Casing
11 Discharge chamber
12 Control chamber (crank chamber)
13 Intake chamber
14 Cylinder
15 Connection passage
16 Connection passage
17 Connection passage
18 Connection passage
19 Fixed orifice
20 Rotational axis
21 Swashplate
22 Piston
23 Connection member
24 Driven pulley
25 Condenser
26 Expansion valve
27 Evaporator
30 Valve body
30a Inner circumferential face
30b Valve seat
31, 32 Connection passage (discharge-side passage)
33 Connection passage (control chamber-side passage)
34 Connection passage (intake-side passage)
35 First valve chamber
35a Seating surface
36 Second valve chamber
36a Seating surface
37 Guide passage
38 Third valve chamber
39 Partition adjustment member
40 Valve element
41 First valve part
42 Second valve part
43 Third valve part
43a Engagement surface
44 Connection passage
50 Pressure-sensitive body
51 Bellows
53 Adapter
53a Hollow cylindrical part
53b Circular seating surface
53c Bulging part
60 Solenoid
62 Casing
63 Sleeve
64 Fixed iron core
65 Driving rod
66 Movable iron core
67 Coil spring
68 Excitation coil
87 Spring
110 Valve element
120 Outer circumferential face part
130 Screw grooves
130a Screw part
M Swashplate-type variable-capacity compressor
V Capacity control valve
Pd Discharge pressure
Ps Intake pressure
Pc Control chamber pressure

The invention claimed is:

1. A capacity control valve, comprising
discharge-side passages communicating a discharge chamber that discharges fluid and a control chamber that controls a discharge rate of fluid;
a first valve chamber formed along the discharge-side passages;
intake-side passages communicating with the control chamber and an intake chamber that takes in fluid;
a second valve chamber formed along the intake-side passages;
a valve element that integrally has a first valve part that opens/closes the discharge-side passages in the first valve chamber and a second valve part that opens/closes, the intake-side passages in the second valve chamber, where the first and second valve parts open/close in opposite directions due to reciprocating motion;
a valve body accommodating the valve element in a manner allowing a reciprocating motion, and cooperating with the valve element to form the first valve chamber and the second valve chamber;
a third valve chamber formed along the intake-side passages at a position closer to the control chamber than to the second valve chamber;
a pressure-sensitive body positioned in the third valve chamber to apply, by extending, a bias force in a direction of opening the first valve part, and also to contract as a surrounding pressure increases;

an adapter provided on a free end of the pressure-sensitive body in extending/contracting direction and having a circular seating surface;

a third valve part that moves integrally with the valve element in the third valve chamber and has a circular engagement surface that opens/closes the intake-side passages by engaging with and separating from the seating surface of the adapter; and a solenoid that applies an electromagnetic drive force to the valve element a direction of closing the first valve part;

wherein:

the valve element is located between the first valve chamber and the second valve chamber, and has an outer circumferential face part slidably movable relative to an inner circumferential face of the valve body;

plural threads of screw grooves are formed on the outer circumferential face part;

each of the plural threads of screw grooves communicates with the first valve chamber and does not communicate with the second valve chamber, when the first valve part is closed, and communicates neither with the first valve chamber nor the second valve chamber, when the first valve part is opened; and each of the plural threads of screw grooves communicates with the first valve chamber, in such a manner that only an incomplete screw part opens to the first valve chamber, when the first valve part is closed.

2. A capacity control valve according to claim 1, wherein the plural threads of screw grooves are provided in a position equally spaced in the circumferential direction.

3. A capacity control valve according to claim 1, wherein at least one end in the side of the first valve chamber of each of the plural threads of screw grooves has the incomplete screw part.

\* \* \* \* \*